(12) United States Patent
Boulot

(10) Patent No.: US 6,917,285 B2
(45) Date of Patent: Jul. 12, 2005

(54) TIRE BLOW-OUT DETECTOR

(75) Inventor: Jean-Francis Boulot, Pont du Chateau (FR)

(73) Assignee: Michelin Recherche et Technique S.A. (CH)

( * ) Notice: Subject to any disclaimer, the term of this patent is extended or adjusted under 35 U.S.C. 154(b) by 23 days.

(21) Appl. No.: 10/417,573

(22) Filed: Apr. 17, 2003

(65) Prior Publication Data

US 2004/0008107 A1 Jan. 15, 2004

Related U.S. Application Data

(63) Continuation of application No. PCT/EP01/12164, filed on Oct. 22, 2001.

(30) Foreign Application Priority Data

Oct. 23, 2000 (FR) .......................................... 00 13772

(51) Int. Cl.$^7$ .............................................. B60C 23/02
(52) U.S. Cl. ...................... 340/442; 340/443; 340/445; 73/146.2
(58) Field of Search ................................ 340/442, 443, 340/445, 447, 425.5, 426.24, 426.33; 73/146, 146.2, 146.8

(56) References Cited

U.S. PATENT DOCUMENTS

| 5,119,066 | A | | 6/1992 | Ballyns |
| 5,231,872 | A | | 8/1993 | Bowler |
| 6,374,666 | B1 | * | 4/2002 | Lemberger et al. ........ 73/146.8 |
| 6,595,046 | B2 | * | 7/2003 | Lemberger et al. ........ 73/146.3 |
| 6,629,454 | B2 | * | 10/2003 | Lundqvist .................. 73/146.8 |

* cited by examiner

*Primary Examiner*—Daryl C Pope
(74) *Attorney, Agent, or Firm*—E. Martin Remick

(57) ABSTRACT

A device for detecting substantially sudden and significant loss of pressure in a tire, comprising:
  a pressure variation detector capable on the one hand of responding in a safety time interval to a substantially significant and rapid variation in the pressure inside the tire cavity, and on the other hand of acting on another element cooperating with said detector;
  a management module, cooperating with said detector and capable, on the basis of the information supplied by said detector, of sending a signal when a given pressure variation threshold is reached.

13 Claims, 6 Drawing Sheets

TIRE BLOW-OUT DETECTOR

The present application is a continuation of International Application No. PCT/EP01/12164, filed Oct. 22, 2001, published in French with an English Abstract on May 2, 2002 under PCT Article 21(2), which claims priority to French Patent Application No. FR00/13772, filed Oct. 23, 2000.

The present invention relates to a tire blow-out detector, allowing very rapid identification of a potentially dangerous situation associated with a substantially sudden and significant loss of pressure such as in the case of a tire puncture or blow-out.

Car and tire manufacturers make ever greater attempts to take account of the constantly increasing demands of modern road users for safety, comfort and convenience. This phenomenon is clear from the commonplace nature of numerous types of device which were virtually non-existent barely a few years ago, such as for example airbags, ABS brakes, ESP (electronic stability program) devices, etc.

However, such devices are still inadequate in really delicate situations such as a substantially sudden and significant loss of pressure in one or more of the tires with which a moving vehicle is fitted. This type of situation may lead to total or partial loss of control of the vehicle, which may cause an accident. If the vehicle is travelling at high speed, this situation may become dangerous and even endanger one or more vehicles as well as the people on board. It is obviously desirable to be able to prevent such situations or at the very least to attempt to minimise the risks inherent therein.

Certain types of pressure sensor are known, for example, which allow measurement of the pressure of a tire at a given time. In general such sensors require an electrical supply to carry out measurements and transmit the information collected. It is known to equip the wheel with a battery. If it is wished to carry out frequent or even continuous pressure measurements, which is indispensable if it is desired to detect puncture of a tire, the battery has to be easily replaceable, since the sensor makes significant demands on the battery, which becomes rapidly discharged. It has to be possible to effect replacement in a simple, quick and cheap manner.

In such a context, problems of reliability are regularly encountered due to the battery's contacts, which have to withstand the most severe of environments. The contacts deteriorate and the supply of electrical energy risks becoming random or unstable, or even being broken off completely.

To remedy this type of situation, non-replaceable batteries are used, which may be incorporated in definitive manner into the electrical circuit, for example by welding. In this way, a more reliable energy supply is achieved. On the other hand, if the life of the battery is to be prevented from being too short, energy consumption has to be restricted, which amounts to non-permanent supply of the sensors. Pressure measurement may for example be performed by sampling at given time intervals. These time intervals have to be as widely spaced as possible, if it is wished, for example, for the life of the battery to correspond as far as possible to the life of a tire, or even the life of the vehicle. Such a situation is not suitable if it is desired to use the pressure sensor to detect a puncture or any other similar type of situation involving a rapid and significant loss of pressure from a tire. Using sampling, for example every 30 or 60 seconds, a possible puncture will be detected solely at the time of the next iteration or measurement, i.e. a certain time after the puncture. However, blow-out detection, to be useful, has to be effected within a very short time, indeed virtually instantaneously. Otherwise, the driver will suffer the consequences of the puncture before being informed thereof. These consequences then serve as a warning, and it is often too late to respond, especially if the vehicle is travelling at high speed.

The present invention is directed at proposing a device for detecting substantially sudden and significant loss of tire pressure, allowing said difficulties to be remedied.

In order to do this, the invention proposes a device for detecting substantially sudden and significant loss of tire pressure, comprising:

a pressure variation detector capable on the one hand of responding in a safety time interval to a substantially significant and rapid variation in the pressure inside the tire cavity, and on the other hand of acting on another element cooperating (electrically or mechanically) with said detector;

a management module, cooperating with said detector and capable, on the basis of the information supplied by said detector, of sending an electrical signal when a given pressure variation threshold is reached.

Such a device allows substantially immediate or substantially instantaneous detection of any significant and substantially sudden loss of tire pressure, such as for example in the case of a tire blow-out. To reduce the risk inherent in this type of situation, it is imperative to obtain the information within a very short time, if possible one in which t tends towards 0 secs. This is the only truly effective way of allowing a response at the opportune time, either on the part of the driver or on the part of a driver assistance device, or indeed of both at once. It is thus possible to respond for example before the loss of pressure effects a loss of control of the vehicle. The safety of the passengers in the vehicle in question and those of other vehicles in the surrounding area is thus improved, whether this be in the case of a blow-out or of any other type of significant and substantially sudden pressure loss in one or more tires of a vehicle.

The set minimum threshold advantageously corresponds substantially to deformation caused by significant and rapid loss of pressure such as occurs upon blow-out of the tire which is being monitored. By way of non-limitative example, the minimum thresholds to be considered as significant, substantially sharp and sudden pressure variations may be of the order of 0.1 bar/sec., and preferably approximately 1 or 2 bar/sec. The response time is preferably less than 100 ms.

The pressure variation detector is advantageously capable of acting on another element cooperating either electrically or mechanically with said detector.

The safety time interval within which it is desirable for the device to respond corresponds advantageously to a very short time, such as for example an time interval within which the time t tends towards 0 seconds. The shorter the time, the more the device can contribute towards improving safety. When the time interval becomes too long to allow a response capable of contributing to an improvement in the safety of the vehicle and the passengers, said time interval is no longer a safety time interval as understood in the present invention.

The signal transmitted by the management module is advantageously of the electrical or radio type.

According to an advantageous example of embodiment, the management module emits a signal (for example electrical or radio or other) capable of actuating a warning means for the driver of the vehicle. The latter may then better respond and/or predict the corrections to be performed in order to keep the vehicle on the steadiest possible path or, at the very least, to increase his/her chances of preventing the vehicle from leaving the carriageway.

According to another advantageous example of embodiment, the management module emits a signal capable of serving as a parameter for a vehicle driver assistance device. Such an assistance device may be a device of the ESP type, a device of the antilock brake system (ABS) type, a device of the antiskid type, etc. These devices may then contribute better to ensuring and maintaining driving safety.

The pressure variation detector is advantageously of the piezoelectric type, this being a technology which is in itself tried and tested, reliable, accurate and allows very short response times, such as for example of less than 100 ms. Moreover, one of the main characteristics of sensors of the piezoelectric type is that they are able to operate without a power supply. More particularly, deformation of the membrane consisting of a piezoelectric type material allows the generation of a micro-current. This current is then used by a circuit for reading and processing or analysing the signal. Only the electronic module requires a power supply, but a very weak one. A long-life battery may thus be provided.

For example, the pressure variation detector comprises a casing provided with two chambers, insulated substantially from one another and separated by a piezoelectric type membrane, a first chamber being subject to a reference pressure and the second being capable of being in fluid communication with the environment of the medium in which it is desired to effect monitoring, said membrane being deformable under the action of a variation in the pressure of said environment, the deformations thus produced allowing the generation of an electrical signal, the strength of which is related to the degree of deformation.

The reference pressure of the reference chamber is substantially constant and does not change at the time of a variation in the pressure of the environment being monitored, which allows the pressure differential between the chambers to change, this latter variation giving rise to the generation of a piezoelectric type signal.

Advantageously, the membrane is adapted to respond with an amplitude and/or a speed of deformation which is a function of the level and/or rate of pressure variation.

Advantageously, the reference pressure corresponds to a vacuum.

The sensor is advantageously disposed in such a way that the environment of the medium in which monitoring is performed corresponds to the pressure inside the tire cavity. For example, the sensor may be disposed directly in said cavity; on the other hand, pipes may allow the environment to be forwarded to the sensor disposed for example in the wheel.

According to one example of embodiment, the piezoelectric type membrane comprises two metallized faces.

According to another advantageous example of embodiment, the pressure variation detector is of the aneroid type.

This technology is simple, reliable, cheap and does not require a large electrical supply to operate. In particular, the aneroid capsule does not require any power supply; only the electronic module requires such a power supply, but a very weak one. A long-life battery may thus be provided.

Thus, for example, it comprises an aneroid capsule provided with a calibrated orifice in fluid communication with the environment of the medium in which it is desired to effect detection, said capsule being deformable under the action of a variation in the pressure of said environment.

Advantageously, an electronic measuring or detecting device is provided which cooperates with said capsule in such a way that the deformations thus produced allow actuation of said electronic device. Said electronic device may be, for example, a threshold detector, calibrated in such a way as to transmit an electrical signal when a pre-established minimum threshold for deformation of the membrane is reached. According to one example of embodiment, said electronic device is a transducer allowing generation of an electrical signal, the strength of which is related to the degree of deformation.

According to another advantageous example of embodiment, a mechanical measuring or detecting member is provided which cooperates with said capsule in such a way that the deformations thus produced allow actuation of said mechanical member. Said mechanical member may be, for example, a threshold detector, calibrated in such a way as to actuate a device capable of transmitting an electrical signal when a pre-established-minimum threshold for deformation of the membrane is reached. According to one example of embodiment, said mechanical member cooperates with a rheostat capable of generating an electrical signal, the strength of which is related to the degree of deformation.

The calibrated orifice is advantageously a capillary tube. At the time of a variation in the monitored pressure, this allows the pressure inside the aneroid capsule to change substantially more slowly than that around the capsule, thereby creating a pressure differential capable of causing deformation of the capsule.

The device according to the invention is advantageously provided for mounting on a wheel; it is then advantageous to provide at least one means of transmitting data to a non-rotating part of the vehicle, in order to ensure that the signals may pass from the wheel to the vehicle. The vehicle may exhibit at least one data receiving means.

The invention also provides a tire comprising a blow-out detection device as described above.

The invention also provides a rim comprising a blow-out detection device as described above.

The invention also provides a method for detecting substantially sudden and significant loss of tire pressure, consisting in:

providing an element (for example a pressure variation detector), which, at the time of a substantially significant and rapid variation in the pressure inside the cavity of the tire, responds within a safety time interval in order to generate a pressure loss signal.

Other characteristics and advantages of the invention will become apparent from a reading of the non-limiting description of the blow-out detection device according to the invention given with reference to the attached Figures, in which.

Figure 4A:
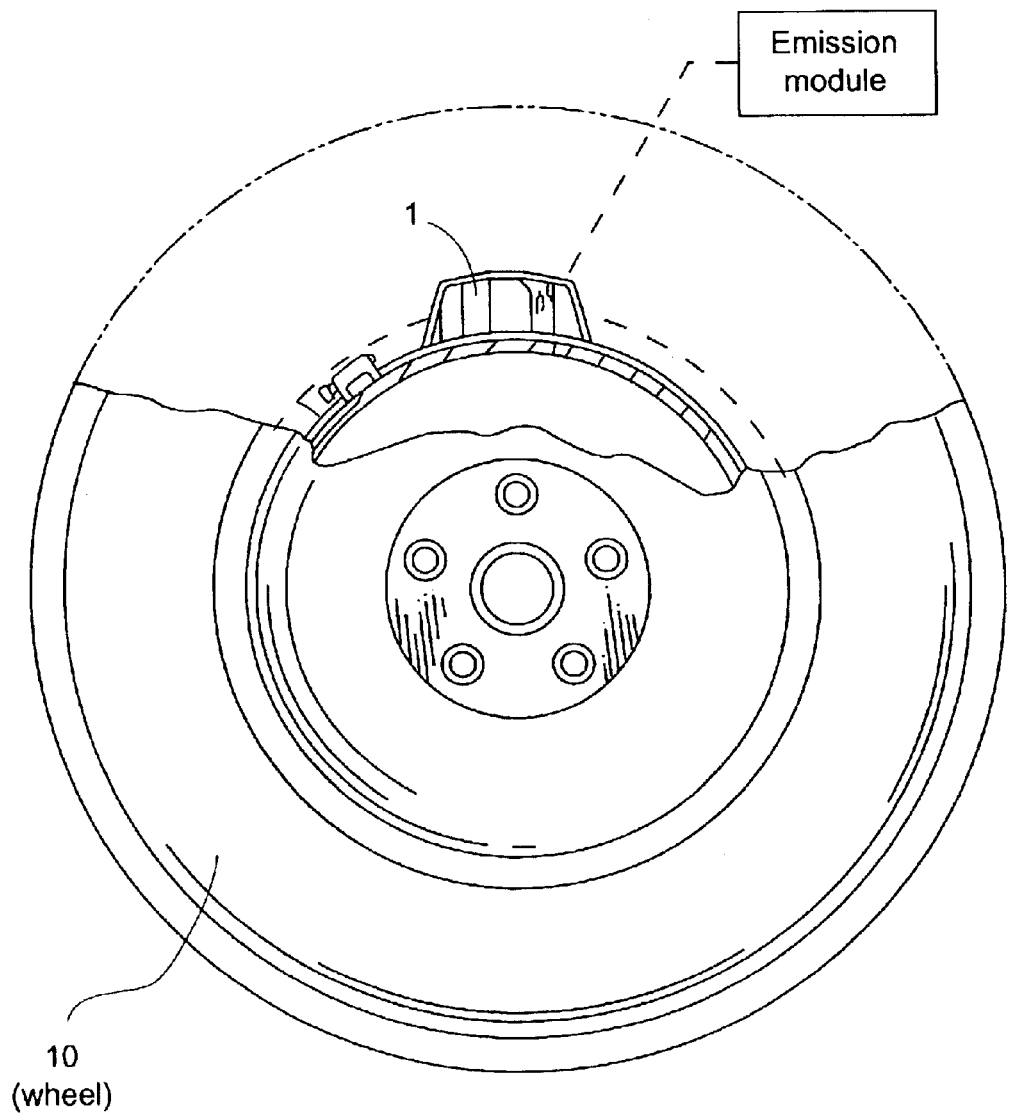
FIGS. 4a and 4b illustrate a functional diagram of a blow-out detection device according to the invention.
Figure 4B:
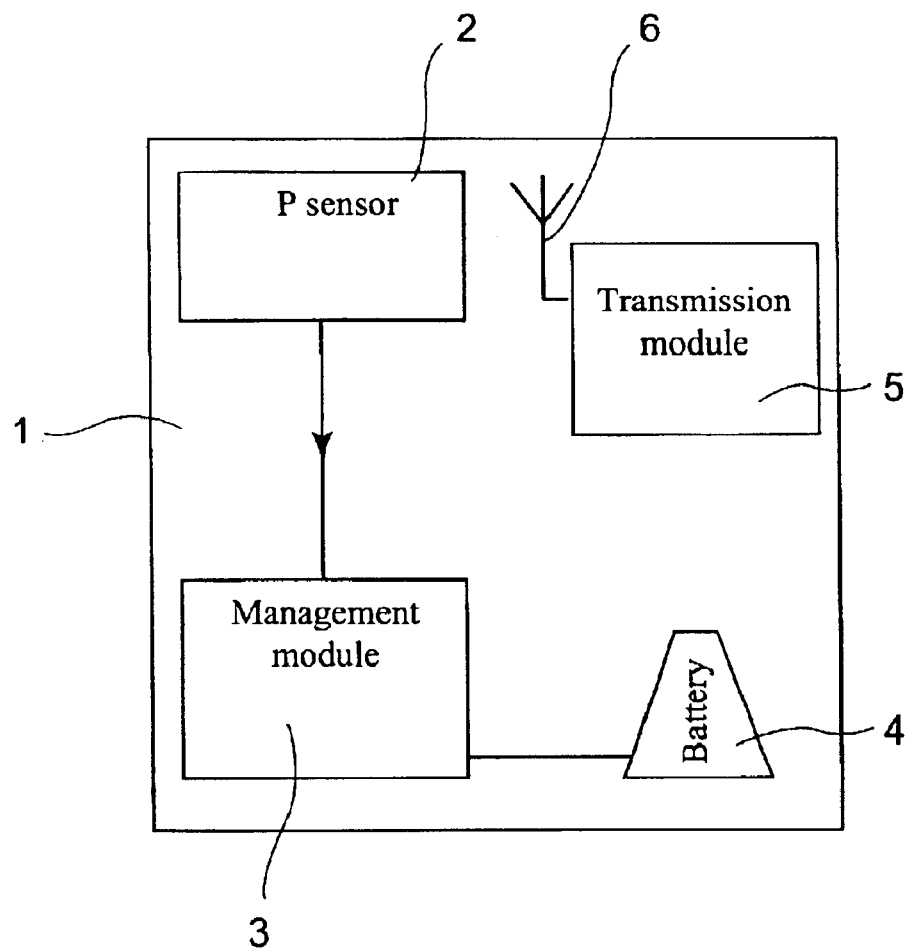

FIG. 4b illustrates a functional diagram of a blow-out detection device 1 according to the invention. It comprises a pressure variation sensor 2, which may be of various types, such as are described below. A management module 3 cooperating electrically or mechanically with the sensor 2 is provided. A battery 4 allows power to be supplied to the module 3, and optionally to the sensor 2, but several advantageous types of sensor according to the invention do not require any power supply, which allows savings to be made with regard to the battery 4. In order to permit the transmission of data from the vehicle wheel 10 to the vehicle, a transmission module 5 is preferably and advantageously provided. This may for example comprise an emitter (preferably HF), a transponder etc. An antenna 6 may optionally complete the device of FIG. 4b.

This device is provided for mounting on a wheel, either on the rim or on the tire. It may also be incorporated into one or other of these elements, such as for example moulded in a wall of the tire. For this reason, a pressure variation detector 2 is preferably used which does not require a power supply, so as to allow the battery 4 to exhibit a service life which may as far as possible match that of the tire, the wheel or the vehicle. The battery 4 is then incorporated into the device 1; it may for example be welded. In this manner, the frequent contact problems inherent in replaceable batteries are avoided.

Figure 1:
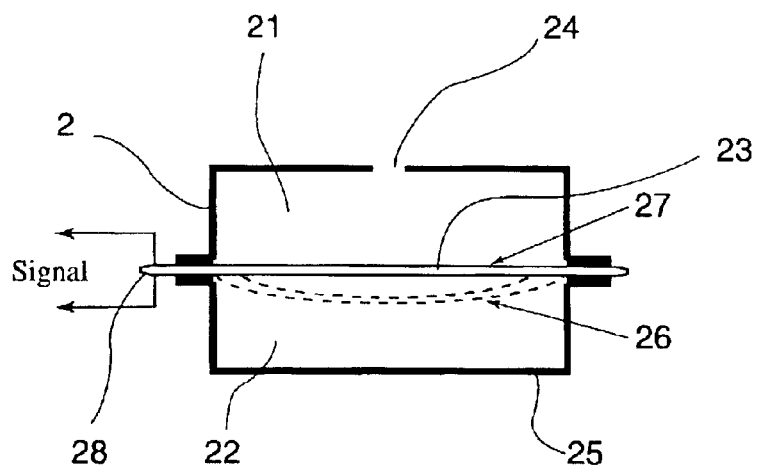
FIG. 1 is a schematic sectional view of a pressure variation sensor according to the invention.
Figure 6:
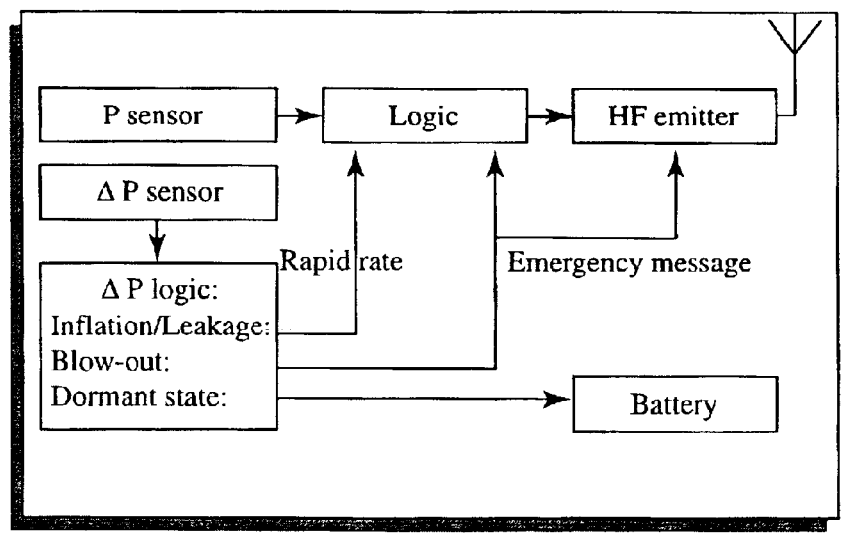
FIG. 6 illustrates a functional diagram of a system for measuring and/or monitoring the pressure of the tires of a vehicle, comprising a pressure sensor and a pressure variation detector.

FIG. 1 illustrates a first type of pressure variation detector 2, of the piezoelectric type. This comprises a casing 25, provided with two chambers 21 and 22, separated and substantially insulated from one another by a piezoelectric type membrane 23. An opening 24 allows fluid communication to be established between a first chamber 21 of the detector and the medium or environment which it is wished to monitor. The chamber 22 is subject to a reference pressure, or is even pressure-less or under a vacuum. An electrical output 28 allows transmission of the weak current signal generated during any deformation of the membrane 23.

If the chamber 22 is under a vacuum, the membrane 23 generally displays concave deformation; it is pushed towards the chamber 22 under vacuum. All additional pressure stemming from the orifice 24 will contribute to deformation of the membrane 23, which will occupy a stabilized position such as for example 26. Any drop in pressure in the control chamber 21 entails fresh deformation of the membrane 23, which then tends to resume its original (substantially flat) shape or profile 27. In the event of a variation in the curvature of the membrane 23, a weak current is emitted, as a function of the amplitude and/or speed of deformation. Thus, a blow-out in the tire connected to the chamber 21 by the orifice 24 entails a significant sharp drop in the pressure in the chamber 21. Deformation of the membrane 23 from a first stabilised profile to a second stabilized profile allows generation of a current by the electrical output 28. This current may thereafter be received by a management module 3 and processed appropriately.

Figure 2:
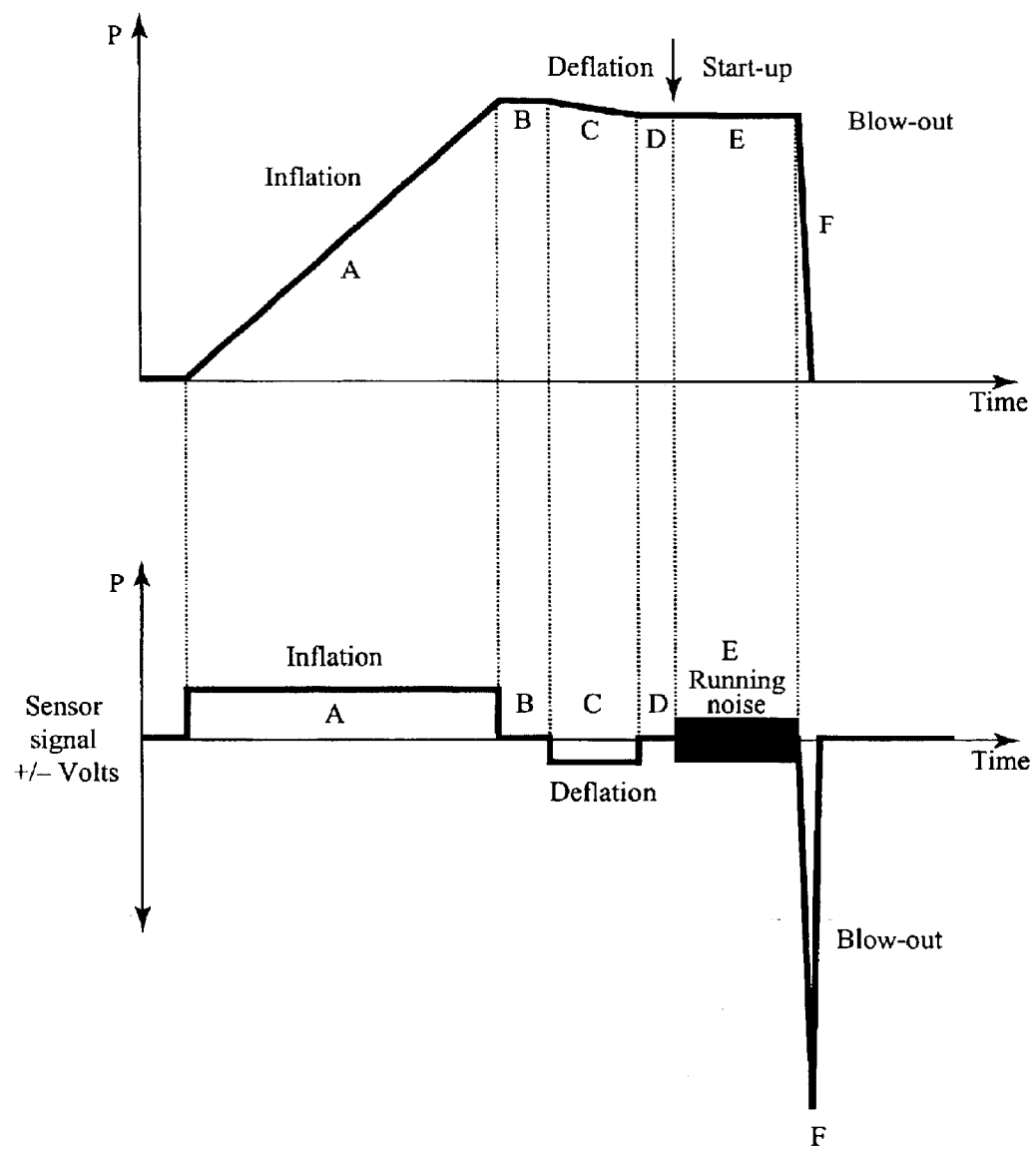
FIG. 2 shows a diagram illustrating examples of signals associated with certain types of pressure variation liable to occur in vehicle tires.

FIG. 2 illustrates examples of signals capable of being generated by a pressure variation detector 2 according to the invention. The Figure shows the relationship between the physical phenomenon present and the corresponding signal of the detector. For example, in inflation mode A, the pressure increases, i.e., changes. This causes the generation of a signal which may for example be positive and constant and is associated with a slight, continuous and regular pressure variation.

At a constant pressure, at B and D, no signal is generated since the membrane remains fixed and does not change in profile.

In the event of a decrease in pressure, at C, a signal which may be for example negative and constant may be associated with a slight, constant and regular pressure reduction.

At F, the tire bursts or suffers very significant and rapid loss of pressure, allowing the generation of a signal in the form of a "spike", of short duration, since the membrane of the sensor is severely deformed for a very short period, the period required to pass from a first substantially stabilised profile to another substantially stabilised profile.

At E, the pressure is stable and the vehicle moves. The running noise may be picked up by the detector, depending on its sensitivity. It then functions as a microphone. This dual function as pressure variation detector/running noise detector is particularly advantageous. For example, this dual function allows a warning signal to be linked with a running or stop mode. The signal may then be processed differently, the first of these two instances being more critical.

Figure 5B:
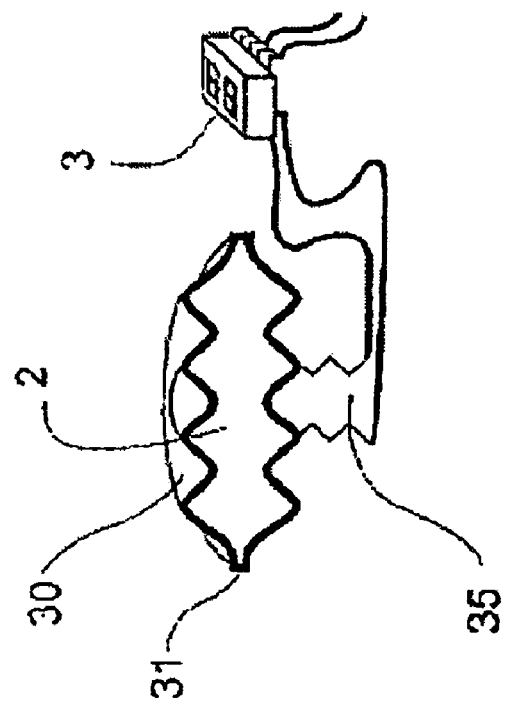
FIGS. 5a and 5b illustrate a functional diagrams of a pressure measuring and/or monitoring device comprising a blow-out detector according to the invention.
Figure 5A:
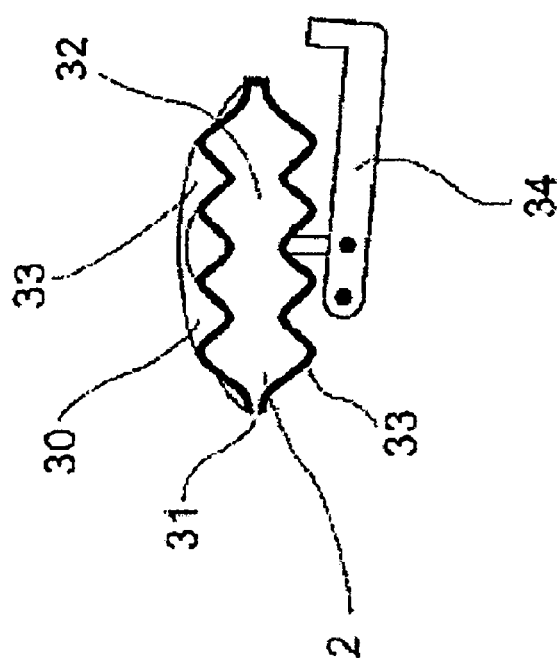

FIGS. 5a and 5b illustrate another type of pressure variation detector 2, comprising an aneroid capsule 30. Said capsule may consist of two scallop-shaped faces 33, joined at their respective edges to form a closed, substantially hermetic casing. A calibrated opening 31, such as for example a capillary tube, is provided, either at the junction of the faces or elsewhere on the capsule. The shape of the capsule may vary, without going beyond the scope of the present invention.

The capsule 30 is arranged in such a way as to actuate a device allowing the information associated with deformation of the capsule to be transformed into information corresponding, for example, to information relating to a dangerous level of-pressure loss, or a blow-out etc. To this end, the capsule may actuate either a mechanical member 34, such as a lever, an arm or the like, an electrical or electronic device 35, such as a variable resistor, or an electromagnetic device, such as a switch. The device in question is advantageously connected to a management module 3, which receives and processes the signal appropriately.

Figure 3:
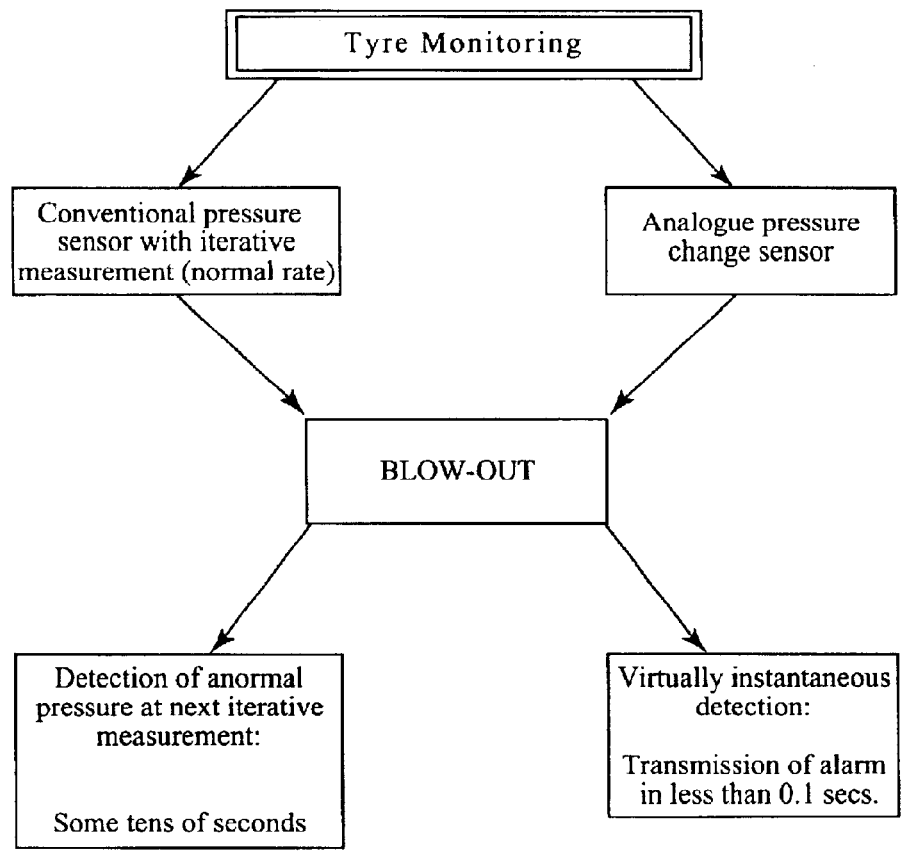
FIG. 3 shows a comparative flowchart for monitoring a tire with, on the one hand, a conventional pressure sensor and, on the other hand, a pressure variation detector according to the invention.

FIG. 3 is a working diagram comparing two tire monitoring modes, the first using a pressure sensor of the known type and the other using a pressure variation detector according to the invention. In the first instance, measurements are effected iteratively, at given time intervals. This type of operation in particular allows battery savings to be made. In the event of a blow-out or any other type of sudden, rapid pressure loss in the tire, the iterative process continues. Measurement of a lower pressure is only effected a few seconds or minutes later, depending on the time interval provided between the iterations. In reality, the driver will generally have noticed the consequences of the problem before the low pressure information is communicated to him/her.

In the other instance, the detector monitors any tire pressure fluctuations continuously. Thus, in the event of a sudden drop in pressure, detection is effected and transmitted almost instantaneously. For example transmission of the alarm may be effected in less than 0.1 seconds. In this case, the driver still has time to respond and prevent the occurrence of a dangerous situation.

What is claimed is:
1. A device for detecting sudden and significant loss of tire pressure, comprising:
 piezoelectric pressure variation detector which responds in a safety time interval to a significant and rapid variation in the pressure inside the cavity of a tire, and which acts on a management module, cooperating with said detector, said pressure variation detector compris- ing a casing provided with two chambers, insulated from one another and separated by a piezoelectric deformable membrane, a first chamber being subject to a reference pressure and a second chamber being in fluid communication with an environment of a medium in which it is desired to effect monitoring, said deformable membrane adopting a given stable profile in an absence of variation in pressure differential between the two chambers, said membrane being adapted to deform so as to pass from a first profile to a second profile under an action of variation in the pressure of said environment, and deformations thus produced allowing for generation of an electrical signal, the strength of which is related to the degree of deformation;

a management module, cooperating with said detector and capable, on a basis of information supplied by said detector, of sending a signal when a given pressure variation threshold is reached.

2. A device for detecting sudden and significant loss of tire pressure according to claim 1, in which the reference pressure corresponds to a vacuum.

3. A blow-out detection device according to claim 1, in which the environment of the medium in which it is desired to effect monitoring corresponds to the pressure inside the cavity of a tire.

4. A device for detecting sudden and significant loss of tire pressure according to claim 1, in which the piezoelectric membrane comprises two metallized faces.

5. A device for detecting sudden and significant loss of tire pressure according to claim 1, in which the management module emits a signal which actuates a warning means for a driver of a vehicle, to which the said tire is attached.

6. A device for detecting sudden and significant loss of tire pressure according to claim 1, in which the management module emits a signal which serves as a parameter for a vehicle driver assistance device.

7. A device for detecting sudden and significant loss of tire pressure according to claim 6, in which said assistance device utilizes ESP technology.

8. A device for detecting sudden and significant loss of tire pressure according to claim 6, in which said assistance device utilizes antilock brake system (ABS) technology.

9. A device for detecting sudden and significant loss of tire pressure according to claim 6, in which said assistance device utilizes antiskid technology.

10. A tire comprising a blow-out detection device according to any one of claims 1 to 9.

11. A tire according to claim 10, in which the blow-out detection device is moulded in a wall in the tire.

12. A rim comprising a blow-out detection device according to any one of claims 1 to 9.

13. A device for monitoring the pressure of at least one tire, comprising a pressure sensor, and a device for detecting a sudden and significant loss of tire pressure according to any one of claims 1 to 9.

* * * * *